3,160,749
SPECTROMETER WITH NOVEL PLURAL CRYSTAL ARRANGEMENT

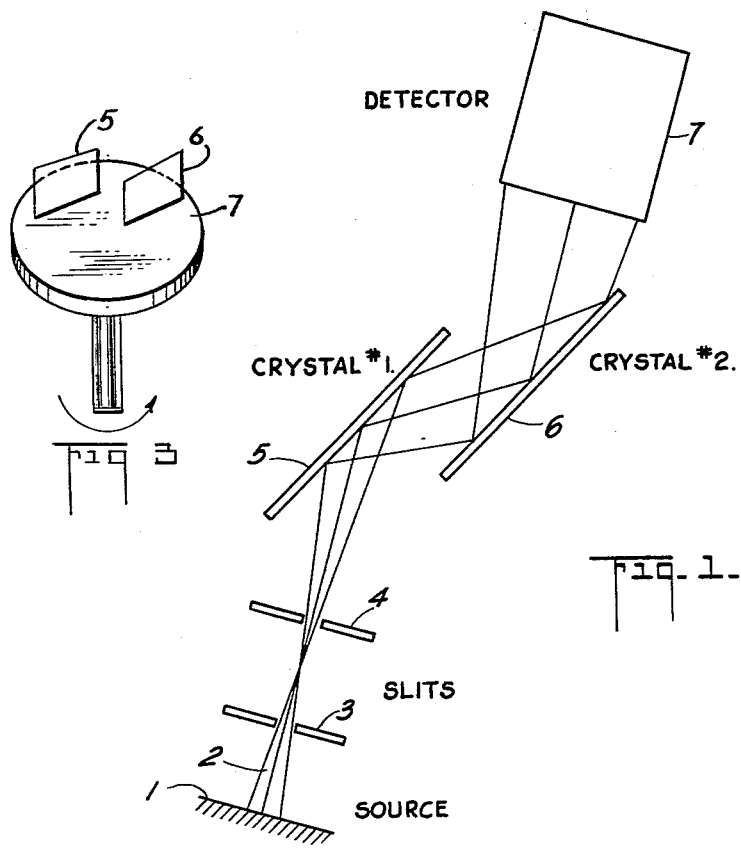
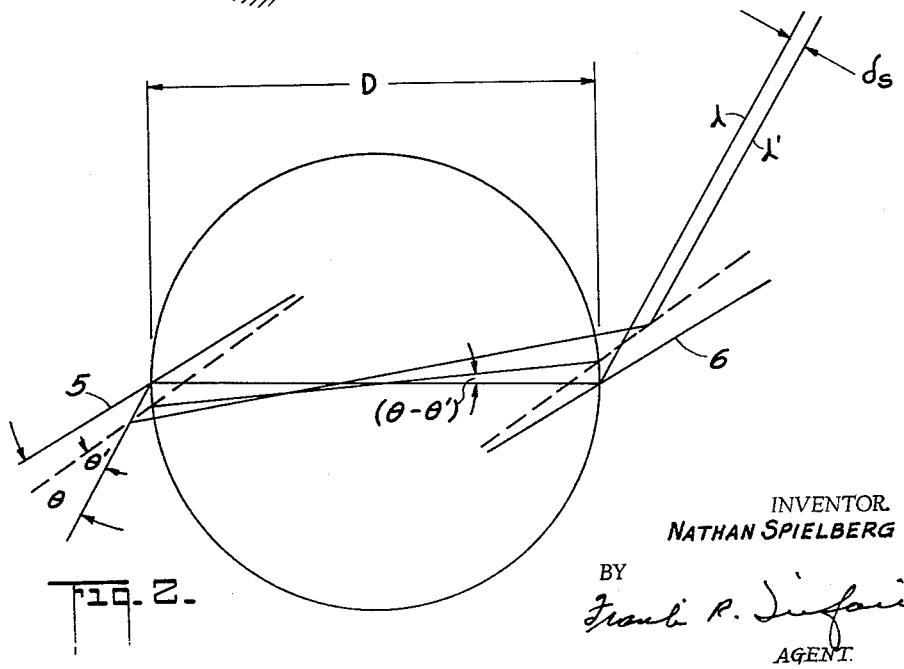

Nathan Spielberg, Hartsdale, N.Y., assignor to North American Philips Company, Inc., New York, N.Y., a corporation of Delaware
Filed Oct. 19, 1962, Ser. No. 231,741
3 Claims. (Cl. 250—51.5)

My invention relates to a spectrometer for measuring penetrative radiation, e.g. X-rays, neutrons, gamma rays, and the like. In particular, the invention relates to a spectrometer in which the radiation is detected without any net angular displacement of the analyzed radiation.

In a conventional spectrometer, penetrative radiation from a source is reflected by an analyzing crystal to a detector. In this arrangement, the crystal rotates about an axis passing through it; the detector rotates with the crystal, about the same axis, at twice the angular speed of rotation of the crystal. In this manner, either the wave-length of the radiation, or the lattice spacing of the crystal can be determined, i.e. if either wave-length, $\lambda$, or the lattice spacing, $d$, is known, the other is found from the relationship:

$$n\lambda = 2d \sin \theta$$

where $\theta$ is the angle of reflection from a crystal plane and $n$ is the order of reflection. If the beam of penetrative radiation incident upon the crystal is polychromatic, i.e. contains a plurality of wave-lengths, the crystal will reflect each wave-length $\lambda_1, \lambda_2 \ldots \lambda_n$ at discrete angles $\theta_1, \theta_2 \ldots \theta_n$ so that by rotating the detector, each wave-length can be detected individually. This arrangement requires a driving mechanism for rotating the detector, usually with the crystal, at a definite angular velocity.

It is an object of my invention to provide a spectrometer for measuring penetrative radiation in which the source and detector are not required to rotate thereby simplifying the mechanical construction of the spectrometer.

Another object of my invention is to provide a spectrometer for analyzing penetrative radiation in which there is no net angular displacement of the analyzed radiation.

A further object of my invention is to provide a spectrometer employing a crystal assembly from which the direction of the analyzed radiation is obtained by a simple translation of the incident radiation direction, the central ray of the reflected radiation being transmitted in a direction parallel to the central ray of the incident radiation.

A still further object of my invention is to provide a spectrometer for the measurement of penetrative radiation, particularly of longer wave-length, more conveniently.

These and further objects of the invention will appear as the specification progresses.

In accordance with the invention, I employ between the source of penetrative radiation and the detector an analyzing crystal assembly which reflects the radiation incident thereon so that a central ray of the reflected radiation is parallel to a central ray of the incident radiation. As the crystal assembly is rotated, the reflected radiation then becomes effectively monochromatized if the incident beam is polychromatic.

Thus, in accordance with the invention, the crystal assembly comprises two crystals each having identical $d$-spacings, and so oriented that the reflecting planes employed are parallel to each other. When the crystals are rotated in a manner that the reflecting planes remain parallel to each other, a central ray of the incident beam which may include several wave-lengths is reflected in a direction parallel to itself, but displaced from the central ray of the incident beam and will include only a single wave-length.

This necessarily follows from Bragg's law which states:

$$n\lambda = 2d \sin \theta$$

Since $d$ is identical for the two crystals, it follows that wave-length, $\lambda$, will be directly dependent upon the reflection angle $\theta$ which equals the angle of incidence. If the crystals are rotated so that the reflecting planes are always parallel to one another, the incident rays are reflected by one crystal at angles determined by the aforesaid relationship to the second crystal. The reflecting planes of the second crystal will reflect rays incident upon them, such that the direction of the central ray of the reflected beam is parallel to the direction of the central ray of the beam incident upon the first crystal.

Thus, the spectrometer may be used as a monochromator, i.e. for selecting a specific wave-length from a polychromatic X-ray beam, or a spectrum analyzer by rotating the two crystals together while maintaining the reflecting planes always parallel either ($a$) by rigidly fixing the crystals relative to each other and rotating them about some axis with the source stationary, or ($b$) by making them rotate separately but with the reflecting planes parallel to each other, again with the source stationary. In either ($a$) or ($b$) the detector need not rotate in order to receive the reflected radiation, but need only be translated slightly sideways parallel to itself.

The invention will be described with reference to the accompanying drawing in which:

FIG. 1 is a diagrammatic view of the spectrometer according to the invention;

FIG. 2 is a diagrammatic view of the ray paths in the spectrometer according to the invention; and FIG. 3 illustrates a simple means for rotating the crystals.

Referring now to FIG. 1, penetrative radiation emerging from source 1 within a bundle 2 whose divergence is limited by limiting slits 3, 4, impinges on a first crystal 5 from which it is reflected in accordance with Bragg's law to second crystal 6. The reflected radiation from latter crystal is detected by a detector 7 which may be a Geiger-Muller tube, proportional counter, a scintillation counter, or even a sensitive photographic plate or film. The source 1 may be a source of X-rays, gamma rays, neutrons, or any other form of penetrative radiation, polychromatic or monochromatic, obeying Bragg's law. The limiting slits may also be Soller slits.

If the crystals are rotated as a unit together, for example by mounting crystals 5 and 6 on a turn table 7 (FIG. 3) which can be rotated, then the sideways displacement of the detector for the central ray when changing from $\lambda$ to $\lambda'$ is given by:

$$\delta s = 2D \sin \theta \ (\cos \theta - \cos \theta')$$

where $\delta s$ is the displacement of the central ray when the two crystal assembly is changed from $\theta$ to $\theta'$ and D is the distance between centers of the crystals, and $\theta$ and $\theta'$ are the Bragg angles corresponding to $\lambda$ and $\lambda'$. (See FIG. 2.)

If the crystals rotate separately but parallel to each other, the displacement is greater and is given by:

$$\delta s = D \sin 2 \ (\theta' - \theta)$$

Since the required detector movement is limited, the spectrometer can be made more compact. Large and massive sources and detectors can be used since they do not have to be moved over large distances. This affords the advantage that shielding of the instrument is greatly simplified.

The spectrometer according to the invention lends itself to the determination of beams of penetrative radiation of relatively long wave-length, i.e. several angstroms or more. Such wave-lengths are rapidly absorbed in air, and spectrometers heretofore employed in the measurement of such wave-lengths have had to be evacuated and operated in vacuum, or with a helium path. Since, in a conventional spectrometer, both the crystal and detector are rotated, this requires elaborate precautions to prevent leakage while permitting movement of the crystals and detector. It will be appreciated that the spectrometer according to the invention greatly simplifies this problem since neither the crystals, nor the detector require a large space in which to move.

For the sake of clarity, the constructional details of the spectrometer have been omitted as these are well known to those skilled in the art. Therefore, while the invention has been described in connection with specific embodiments, other modifications thereof will be apparent to those skilled in the art without departing from its spirit and scope.

What I claim is:

1. In a spectrometer for measuring penetrative radiation from a source thereof and including a detector for said radiation spaced from said source, an analyzing crystal assembly interposed between the source and the detector comprising a plurality of spaced crystals each having identical $d$-spacings, said crystals being oriented with their reflecting planes parallel to one another, one of said crystals being positioned to intercept radiation from said source incident on its reflecting planes and reflect radiation corresponding to said incident radiation to another of said crystals which is oriented to reflect the radiation reflected to it by the first mentioned crystal to the detector, and means to rotate the crystals while maintaining the reflecting planes of each of said crystals parallel to one another.

2. In a spectrometer for measuring penetrative radiation from a source thereof and including a detector for said radiation spaced from said source, an analyzing crystal assembly interposed between the source and the detector comprising a plurality of spaced crystals each having identical $d$-spacings, said crystals being oriented with their reflecting planes parallel to one another, one of said crystals being positioned to intercept radiation from said source incident on its reflecting planes and reflect radiation corresponding to said incident radiation to another of said crystals which is oriented to reflect the radiation reflected to it by the first mentioned crystal to the detector, and means to rotate the crystals jointly about a common axis while maintaining the reflecting planes of each of said crystals parallel to one another.

3. In a spectrometer for measuring penetrative radiation from a source thereof and including a detector for said radiation spaced from said source, an analyzing crystal assembly interposed between the source and the detector comprising a plurality of spaced crystals each having identical $d$-spacings, said crystals being oriented with their reflecting planes parallel to one another, one of said crystals being positioned to intercept radiation from said source incident on its reflecting planes and reflect radiation corresponding to said incident radiation to another of said crystals which is oriented to reflect the radiation reflected to it by the first mentioned crystal to the detector, and means to rotate the crystals separately while maintaining the reflecting planes of each of said crystals parallel to one another.

References Cited in the file of this patent

UNITED STATES PATENTS 2,926,258    Weissimann _____ Feb. 23, 1960